United States Patent
Takeda

(10) Patent No.: US 10,434,648 B2
(45) Date of Patent: Oct. 8, 2019

(54) TASK PLANNING DEVICE

(71) Applicant: FANUC CORPORATION, Yamanashi (JP)

(72) Inventor: Toshiya Takeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 83 days.

(21) Appl. No.: 15/832,509

(22) Filed: Dec. 5, 2017

(65) Prior Publication Data

US 2018/0178379 A1     Jun. 28, 2018

(30) Foreign Application Priority Data

Dec. 27, 2016  (JP) ................................. 2016-253940

(51) Int. Cl.
*B25J 9/16* (2006.01)

(52) U.S. Cl.
CPC ........... *B25J 9/1661* (2013.01); *B25J 9/1669* (2013.01); *B25J 9/1671* (2013.01); *Y02P 70/163* (2015.11); *Y02P 90/02* (2015.11); *Y02P 90/30* (2015.11)

(58) Field of Classification Search
CPC ...... B25J 9/1671; B25J 9/1661; B25J 9/1669; Y02P 70/163; Y02P 90/02; Y02P 90/30
See application file for complete search history.

(56) References Cited

U.S. PATENT DOCUMENTS

| | | | | |
|---|---|---|---|---|
| 5,341,459 | A | * | 8/1994 | Backes ................. B25J 9/1661 700/260 |
| 5,930,461 | A | * | 7/1999 | Bernstein ............... B25J 9/1671 700/247 |
| 2006/0072809 | A1 | | 4/2006 | Hashimoto et al. |
| 2007/0168082 | A1 | * | 7/2007 | Kim ....................... B25J 9/1658 700/245 |
| 2007/0179652 | A1 | | 8/2007 | Weigang et al. |
| 2012/0215352 | A1 | * | 8/2012 | Eberst .................... B25J 9/1664 700/253 |

FOREIGN PATENT DOCUMENTS

| | | |
|---|---|---|
| EP | 1645373 A2 | 4/2006 |
| JP | H08-166809 A | 6/1996 |
| JP | H09-150331 A | 6/1997 |
| JP | H10-039909 A | 2/1998 |

(Continued)

OTHER PUBLICATIONS

Search Report dated Jun. 14, 2018 in corresponding Japanese Patent Application No. 2016-253940; 15 pages.

(Continued)

*Primary Examiner* — Stephen Holwerda
(74) *Attorney, Agent, or Firm* — Maier & Maier, PLLC

(57) ABSTRACT

Provided is a task planning device including a simulator that is configured to simulate operation of a robot system including a plurality of devices by using models of the plurality of devices allocated in a virtual space, a system state acquisition unit that is configured to acquire a state of the robot system, and a task plan generation unit that is configured to dynamically generate a task plan to be executed by the robot system by operating the simulator based on the state acquired by the system state acquisition unit and content of a task instructed by a user.

6 Claims, 6 Drawing Sheets

(56) References Cited

FOREIGN PATENT DOCUMENTS

| JP | 2002-215214 A | 7/2002 |
| JP | 2006-105782 A | 4/2006 |
| JP | 2008-152383 A | 7/2008 |
| JP | 2009-205387 A | 9/2009 |
| JP | 2010-176388 A | 8/2010 |
| JP | 2010-211726 A | 9/2010 |
| JP | 2012-171091 A | 9/2012 |

OTHER PUBLICATIONS

Japanese Office Action dated Jun. 19, 2018, in connection with corresponding JP Application No. 2016-253940 (6 pgs., including English translation).

Japanese Office Action dated Aug. 28, 2018, in connection with corresponding JP Application No. 2016-253940 (6 pgs., including English translation).

\* cited by examiner

FIG. 4A

| | PROCESS | PROCESS INFORMATION | | | | | |
|---|---|---|---|---|---|---|---|
| | | AVAILABLE DEVICE AND OPERATION PROGRAM | | | | EXCLUSIVELY USED RESOURCE | PROCESS ORDER RESTRAINT CONDITION |
| | | ROBOT #1 | ROBOT #2 | MACHINE TOOL #1 | MACHINE TOOL #2 | | |
| P1 | SUPPLY WORKPIECE TO WORKPIECE SUPPLY PORT | — | — | — | — | — | — |
| P2 | HOLD WORKPIECE AT WORKPIECE SUPPLY PORT | PRG_R1_1 | — | — | — | — | P1 |
| P3 | HOLD WORKPIECE AT MACHINE TOOL #1 | PRG_R1_2 | — | — | — | — | P6, P9 |
| P4 | HOLD WORKPIECE AT MACHINE TOOL #2 | — | PRG_R2_1 | — | — | — | P10 |
| P5 | HOLD WORKPIECE AT TEMPORARY PLACING TABLE | PRG_R1_3 | PRG_R2_2 | — | — | TEMPORARY PLACING TABLE | P7, P12 |
| P6 | PLACE WORKPIECE HELD AT WORKPIECE SUPPLY PORT ONTO MACHINE TOOL #1 | PRG_R1_4 | — | — | — | — | P2 |
| P7 | PLACE WORKPIECE HELD AT WORKPIECE SUPPLY PORT ONTO TEMPORARY PLACING TABLE | PRG_R1_5 | — | — | — | TEMPORARY PLACING TABLE | P2 |
| P8 | PLACE WORKPIECE HELD AT MACHINE TOOL #1 ONTO TEMPORARY PLACING TABLE | PRG_R1_6 | — | — | — | TEMPORARY PLACING TABLE | P3 |
| P9 | PLACE WORKPIECE HELD AT TEMPORARY PLACING TABLE ONTO MACHINE TOOL #1 | PRG_R1_7 | — | — | — | — | P5 |
| P10 | PLACE WORKPIECE HELD AT TEMPORARY PLACING TABLE ONTO MACHINE TOOL #2 | — | PRG_R2_3 | — | — | — | P5 |

FIG. 4B

| | PROCESS | PROCESS INFORMATION | | | | | |
|---|---|---|---|---|---|---|---|
| | | AVAILABLE DEVICE AND OPERATION PROGRAM | | | | EXCLUSIVELY USED RESOURCE | PROCESS ORDER RESTRAINT CONDITION |
| | | ROBOT #1 | ROBOT #2 | MACHINE TOOL #1 | MACHINE TOOL #2 | | |
| P11 | PLACE WORKPIECE HELD AT TEMPORARY PLACING TABLE ONTO WORKPIECE DISCHARGE PORT | --- | PRG_R2_4 | --- | --- | --- | P5 |
| P12 | PLACE WORKPIECE HELD AT MACHINE TOOL #2 ONTO TEMPORARY PLACING TABLE | --- | PRG_R2_5 | --- | --- | TEMPORARY PLACING TABLE | P4 |
| P13 | PLACE WORKPIECE HELD AT MACHINE TOOL #2 ONTO WORKPIECE DISCHARGE PORT | --- | PRG_R2_6 | --- | --- | --- | P4 |
| P14 | PERFORM CHANGEOVER OF WORKPIECE ON MACHINE TOOL #1 | PRG_R1_8 | --- | --- | --- | --- | P6, P9 |
| P15 | PERFORM CHANGEOVER OF WORKPIECE ON MACHINE TOOL #2 | --- | PRG_R2_7 | --- | --- | --- | P10 |
| P16 | PERFORM PROCESSING A | --- | --- | PRG_M1_1 | PRG_M2_1 | --- | P6 AND P9 (FOR MACHINE TOOL #1) OR P10 (FOR MACHINE TOOL #2). ※P14 AND P15 REQUIRED WHEN P17 IS EXECUTED BY SAME TOOL RIGHT BEFORE |
| P17 | PERFORM PROCESSING B | --- | --- | PRG_M1_2 | PRG_M2_2 | --- | P6 AND P9 (FOR MACHINE TOOL #1) OR P10 (FOR MACHINE TOOL #2). ※P14 AND P15 REQUIRED WHEN P16 IS EXECUTED BY SAME TOOL RIGHT BEFORE |
| P18 | DISCHARGE WORKPIECE FROM WORKPIECE DISCHARGE PORT | --- | --- | --- | --- | --- | P10, P12 |

TASK PLANNING DEVICE

CROSS-REFERENCE TO RELATED APPLICATIONS

This application is based on Japanese Patent Application No. 2016-253940, the content of which is incorporated herein by reference.

TECHNICAL FIELD

The present invention relates to a task planning device suitable for producing a task plan of tasks to be performed in a system including a plurality of devices.

BACKGROUND ART

Conventionally, when a plurality of processes are involved in a task to be performed in a system including devices such as machine tools and robots, for example, a Gantt chart has been produced in advance to determine allocation of each process to each device and the order of execution of the processes.

For example, PTL 1 discloses a device configured to produce a task plan in advance when a product is to be manufactured from a plurality of members.

CITATION LIST

Patent Literature

{PTL 1}
Japanese Unexamined Patent Application, Publication No. 2010-176388

SUMMARY OF INVENTION

An aspect of the present invention is a task planning device including: a simulator that is configured to simulate operation of a robot system including a plurality of devices by using models of the plurality of devices allocated in a virtual space; a system state acquisition unit that is configured to acquire a state of the robot system; and a task plan generation unit that is configured to dynamically generate a task plan to be executed by the robot system by operating the simulator based on the state acquired by the system state acquisition unit and content of a task instructed by a user.

BRIEF DESCRIPTION OF DRAWINGS

FIG. 4A is a table listing exemplary processes and process information at the robot system illustrated in FIG. 2.

FIG. 4B is a table listing exemplary processes and process information at the robot system illustrated in FIG. 2.

DESCRIPTION OF EMBODIMENTS

The following describes a task planning device according to an embodiment of the present invention with reference to the accompanying drawings.

Figure 1:
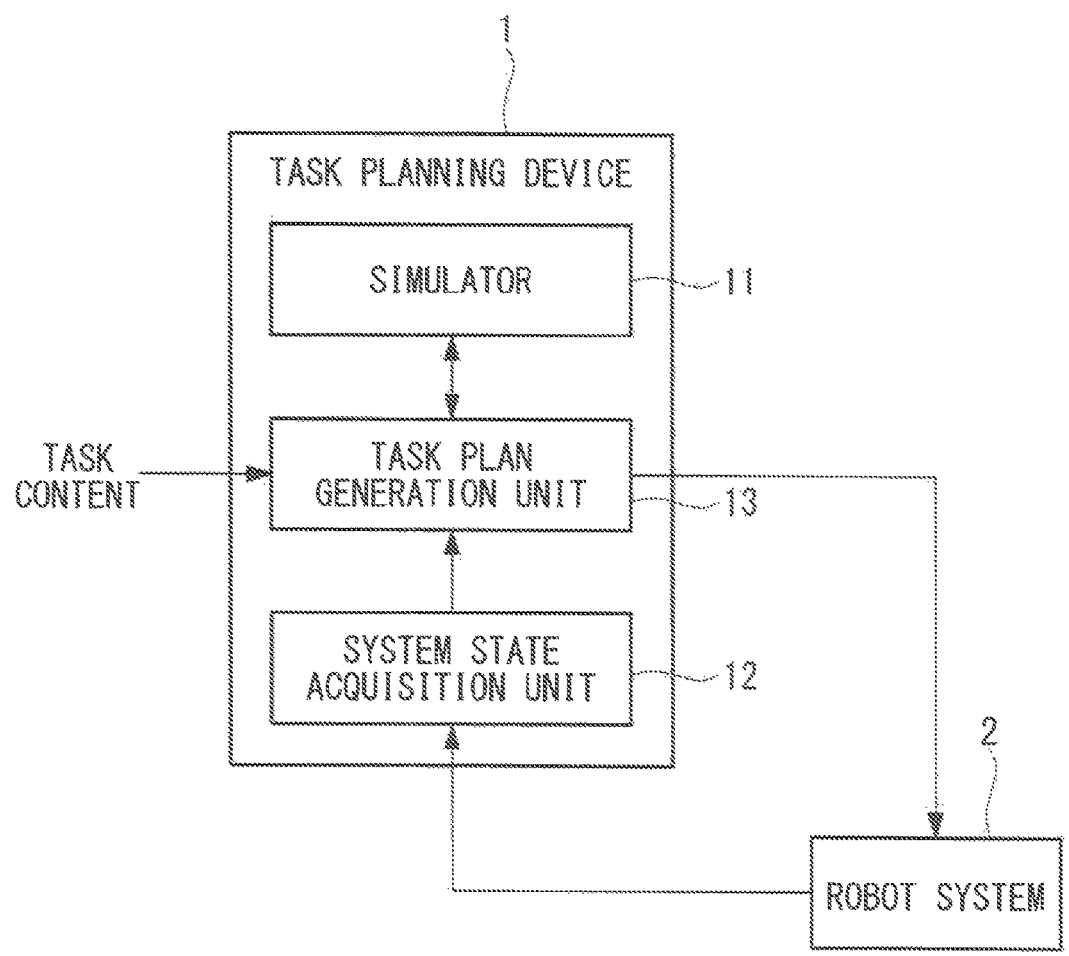
FIG. 1 is a block diagram illustrating a schematic configuration of a task planning device according to an embodiment of the present invention.

As illustrated in FIG. 1, a task planning device 1 is configured to receive a task content instructed by a user and generate a task plan based on this task content, thereby planning tasks to be performed at a robot system 2 connected with the task planning device 1.

The task planning device 1 includes a central processing unit (CPU), a main storage device such as a read only memory (ROM) or a random access memory (RAM), an auxiliary storage device such as a hard disk drive (HDD), an input device such as a key board, a mouse, or a touch panel, an output device such as a monitor, and an external interface configured to communicate various kinds of data with an external equipment. The auxiliary storage device stores a computer program that achieves each function to be described later. When executed, the computer program is read onto the main storage device from the auxiliary storage device by a processor.

The task planning device 1 functionally includes a simulator 11, a system state acquisition unit 12, and a task plan generation unit 13. The simulator 11 is connected with the task plan generation unit 13. The system state acquisition unit 12 is connected with the robot system 2 and the task plan generation unit 13. The task plan generation unit 13 is connected with the robot system 2, the simulator 11, and the system state acquisition unit 12.

The robot system 2 includes a plurality of devices including a robot.

The simulator 11 is configured to simulate operation of the robot system 2 connected with the task planning device 1. More specifically, the simulator 11 simulates the operation of the robot system 2 by allocating, in a virtual space, models of a robot, a machine tool, and the like included in the robot system 2, and by operating the models in the virtual space in accordance with a task plan generated by the task plan generation unit 13. Accordingly, the simulator 11 can calculate an executing time of each process included in the task plan. The simulator 11 operates the models in the virtual space to detect any interference among the devices.

The system state acquisition unit 12 is configured to acquire information related to a system state of the robot system 2. The information related to the system state includes, for example, information on whether each device included in the robot system 2 is in a stand-by state or an operational state, a scheduled end time of a process being executed, and an abrasion state of a tool used at each device. The scheduled end time of a process being executed can be calculated based on the actual start time of this process and an executing time of this process, which is calculated by the simulator 11 and included in the task plan generated by the task plan generation unit 13.

The task plan generation unit 13 is configured to operate the simulator 11 with reference to the task content input by the user, the information related to the system state acquired by the system state acquisition unit 12, and a process information table stored in the auxiliary storage device (not illustrated) included in the task planning device 1, calculate an entire task time taken for execution of the task content and generate a task plan optimized to minimize the entire task time.

The process information table lists a plurality of processes executable at the robot system 2 and process information corresponding to these processes.

The process information includes a restraint condition indicating a device available for execution of the corresponding process, an operation program for the device, an exclusively used resource, and an execution order relative to the other processes.

The optimization may be achieved by various kinds of ways such as a genetic algorithm.

The following describes a specific example of processing performed at the above-described task planning device 1 with reference to FIGS. 2 to 5.

Figure 2:
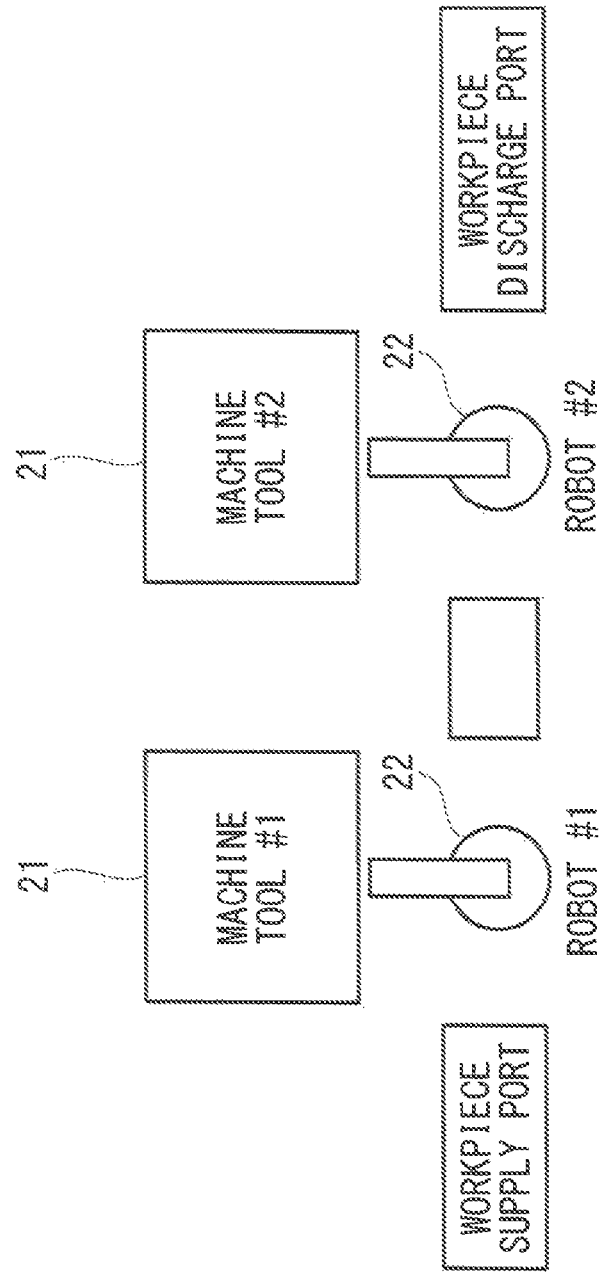
FIG. 2 is a diagram illustrating an exemplary robot system connected with the task planning device illustrated in FIG. 1.

In the Example, it is assumed that, as illustrated in FIG. 2, the robot system 2 includes machine tools 21 referred to as Machine Tools #1 and #2, and robots 22 referred to as Robots #1 and #2.

The Example is assumed on preconditions as follows:
a plurality of workpieces supplied through a workpiece supply port are machined by the machine tools 21 and discharged through a workpiece discharge port;
a workpiece is moved by the robots 22;
the workpiece has two surfaces of front and back surfaces, which are to be provided with different fabrication (fabrication A and fabrication B);
fabrication A and B may be performed by any of Machine Tools #1 and #2; and
fabrication A and B requires a changeover by the robots 22 to turn the workpiece upside down.

FIGS. 4A and 4B illustrate an exemplary process information table listing a plurality of processes executable at the robot system 2 and process information corresponding to these processes in this case. As illustrated in FIGS. 4A and 4B, the processes executable at the robot system 2 are Processes P1 to P18. The process information corresponding to each process includes an available device, an operation program therefor, an exclusively used resource, and a restraint condition.

In FIGS. 4A and 4B, "PRG_R1_1" to "PRG_R1_8" each refer to an operation program for Robot #1, which is necessary for executing the corresponding process. "PRG_R2_1" and "PRG_R2_7" each refer to an operation program for Robot #2, which is necessary for executing the corresponding process. "PRG_M1_1" and "PRG_M1_2" each refer to an operation program for Machine Tool #1, which is necessary for executing the corresponding process. "PRG_M2_1" and "PRG_M2_2" each refer to an operation program for Machine Tool #2, which is necessary for executing the corresponding process. These operation programs are stored in, for example, the auxiliary storage device (not illustrated) included in the task planning device 1 or a storage device (not illustrated) included in the robot system 2.

In the Example, the exclusively used resource is a temporary placing table at which interference potentially occurs between Robots #1 and #2. Thus, as illustrated in FIGS. 4A and 4B, the temporary placing table is set as the exclusively resource of the process information corresponding to a process using the temporary placing table.

A process order restraint condition of the process information indicates a process needed to be performed before the corresponding process.

The process information table illustrated in FIGS. 4A and 4B is stored in the auxiliary storage device (not illustrated) included in the task planning device 1 and is referred to as necessary.

Figure 3:
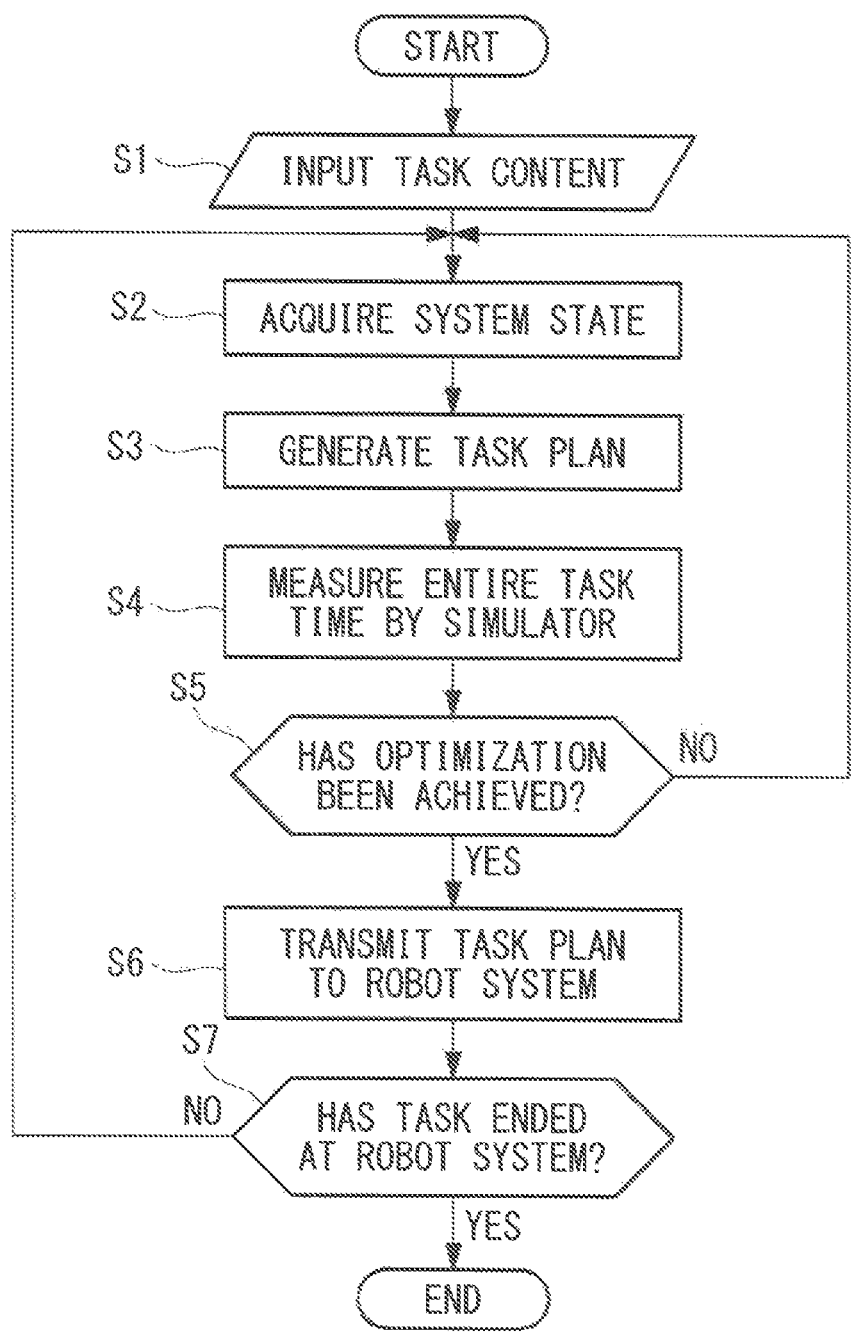
FIG. 3 is a flowchart of processing executed at the task planning device illustrated in FIG. 1.

The following describes processing executed at the task planning device 1 with reference to a flowchart illustrated in FIG. 3.

First, the user inputs a task content to the task plan generation unit 13 of the task planning device 1 (step S1 in FIG. 3). In the Example, the task content is "processing A and processing B on a workpiece".

Subsequently, the system state acquisition unit 12 acquires information related to the current system state of the robot system 2 (step S2 in FIG. 3).

Subsequently, the task plan generation unit 13 generates a task plan (step S3 in FIG. 3). Specifically, with the input task content as a goal, the task plan generation unit 13 generates a task plan based on the process information table and the information related to the system state acquired by the system state acquisition unit 12. For example, the task plan generation unit 13 may generate a random number to find a device, a process, and a process order that are appropriate for execution of the task content. In this manner, in the Example, the task plan generation unit 13 generates a sequential task plan that, as illustrated in FIG. 5, once a workpiece is input to the workpiece supply port at Process P1, Robot #1 executes Processes P2 to P7, Robot #2 executes Processes P5 to P10, Machine Tool #2 executes Process P16, Robot #2 executes Processes P4, P7, P5, and P10, Machine Tool #2 executes Process P17, and Robot #2 executes Process P13, before the workpiece is finally discharged through the workpiece discharge port at Process P18.

Subsequently, the task plan generation unit 13 operates the simulator 11 based on the generated task plan, and an entire task time taken by the simulator 11 is measured (step S4 in FIG. 3). The entire task time includes the sum of task times taken for processes, any stand-by time due to dependency among the processes, and any interlock time due to interference among the devices. In the Example, the entire task time is a time between Processes P1 and P18 as illustrated in FIG. 5.

Figure 5:
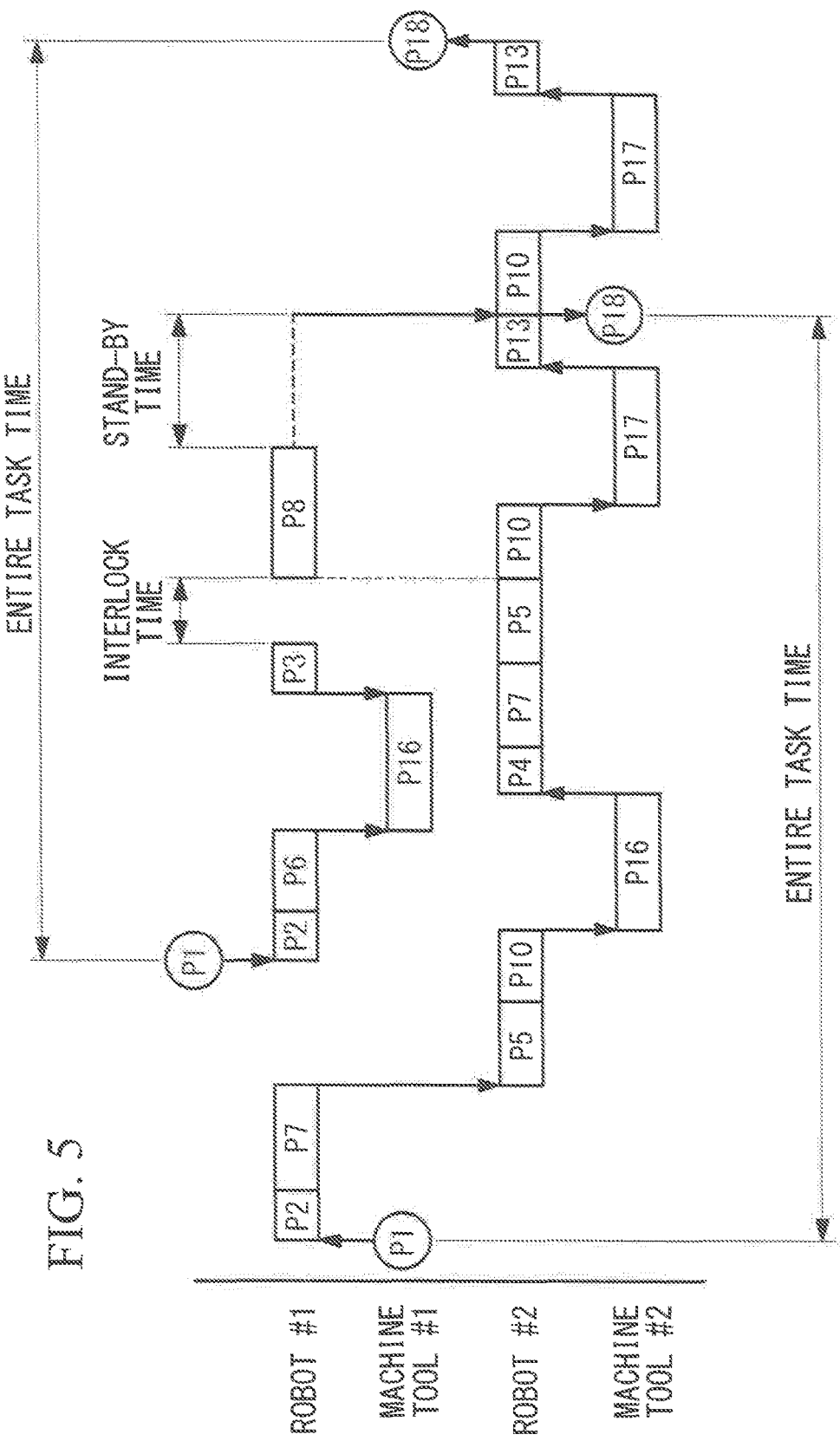
FIG. 5 is a diagram illustrating an exemplary task performed at the robot system illustrated in FIG. 2.

In FIG. 5, no stand-by time nor interlock time is set in a task plan for a workpiece supplied first, and thus the entire task time is the sum of task times taken for processes. In a task plan for a workpiece supplied second, however, an interlock time is provided right before Process P8, which is performed by Robot #1, to avoid interference that would otherwise occur between Robot #1 and Robot #2 when the temporary placing table as an exclusively used resource is simultaneously used in Processes P5 and P8. In addition, a stand-by time is provided right after Process P8 to plan a stand-by until Robot #2 is available. In this case, the entire task time includes the sum of task times taken for processes, the interlock time, and the stand-by time.

Subsequently at step S5, it is determined whether the entire task time measured by the simulator 11 is an optimized task time. The optimization refers to generation of a task plan with which the entire task time is minimized. At step S5, when it is determined that no optimization has been achieved, steps S2 to S4 are repeated until it is determined that the optimization has been achieved. The determination of the optimization may be performed based on, for example, the number of repetitions as a reference.

When it is determined that the optimization has been achieved at step S5, the task plan generation unit 13 transmits the optimized task plan to the robot system 2 (step S6 in FIG. 3). Each device included in the robot system 2 operates based on the task plan transmitted by the task plan generation unit 13.

Lastly at step S7, it is determined whether a task has ended at the robot system 2. When it is determined that the task has not ended at the robot system 2, the processing returns to step S2, where the system state acquisition unit 12 acquires information related to the system state of the robot system 2 in operation. Then, at the following step S3, the task plan is dynamically updated and optimized based on the information related to the system state of the robot system 2 acquired by the system state acquisition unit 12. In this manner, the task plan is updated in accordance with the current system state in operation, which leads to more highly efficient operation of the robot system 2.

When a task plan is dynamically produced as described above, processing at the task plan generation unit 13 needs to be executed in real time. To achieve this, a remaining time until the task plan generation unit 13 can issue a next instruction to the robot system 2 is estimated for each process from the scheduled end time of a process being currently executed. Then, the range of optimization is determined by using the estimated remaining time as a parameter.

For example, the optimization may be performed only near a certain process determined in advance when the remaining time is short, or the optimization may be performed in a wider range when the remaining time is long. The interlock may be finely or roughly set in accordance with the remaining time.

Although the embodiment of the present invention is described above in detail with reference to the accompanying drawings, the specific configuration of the present invention is not limited to the embodiment but includes, for example, any design change without departing from the scope of the present invention.

For example, the embodiment describes above the example in which the task planning device 1 generates a task plan for the robot system 2, but the present invention is not limited thereto. The task planning device 1 may generate a task plan for a system including no robot, or may generate a task plan for a system, which includes a task performed by an operator.

When interlock occurs, a device that performs the corresponding process does not operate during the interlock time in the above-described embodiment, but may, for example, slowly operate to avoid interference with any other device.

As a result, the above-described embodiment leads to the following aspect.

An aspect of the present invention is a task planning device including: a simulator that is configured to simulate operation of a robot system including a plurality of devices by using models of the plurality of devices allocated in a virtual space; a system state acquisition unit that is configured to acquire a state of the robot system; and a task plan generation unit that is configured to dynamically generate a task plan to be executed by the robot system by operating the simulator based on the state acquired by the system state acquisition unit and content of a task instructed by a user.

With this configuration, the task plan to be executed by the robot system is dynamically generated by operating, based on the content of the task instructed by the user and the state of the robot system acquired by the system state acquisition unit, the simulator configured to simulate operation of the robot system including the plurality of devices.

In this manner, the task plan can be optimized in real time in accordance with the state of the robot system in operation.

In the above-described task planning device according to the aspect of the present invention, the task plan generation unit may calculate an entire task time based on a time taken for each process included in the task, a stand-by time until execution of each process, and a time in which devices used in each process interfere with each other, and may perform optimization to minimize the entire task time.

The present invention allows optimization of a task plan in real time.

REFERENCE SIGNS LIST 1 task planning device
2 robot system
11 simulator
12 system state acquisition unit
13 task plan generation unit
21 machine tool
22 robot

The invention claimed is:
1. A task planning device comprising:
a processor, the processor configured to:
simulate operation of a robot system comprising a plurality of devices by using models of the plurality of devices allocated in a virtual space;
acquire information on an operational state of each device, a scheduled end time of a process being executed, and an abrasion state of a tool used at each device as a state of the robot system; and
dynamically and in real time generate a task plan to be executed by the robot system by operating the simulator based on the acquired state and content of a task instructed by a user, wherein the task plan involves the coordination of the plurality of devices and the task plan is optimized to minimize the operation of the plurality of devices.
2. The task planning device according to claim 1, wherein the generation of the task plan calculates an entire task time based on a time taken for each process included in the task, a stand-by time until execution of each process, and a time in which devices used in each process interfere with each other, and performs optimization to minimize the entire task time.
3. The task planning device according to claim 1, wherein the generation of the task plan estimates a remaining time until the task plan generation unit can issue a next instruction to the robot system and determines a range of optimization by using the estimated remaining time as a parameter from the scheduled end time of the process being currently executed.
4. The task planning device according to claim 1, further comprising optimizing the task plan using a genetic algorithm.
5. The task planning device according to claim 1, wherein the processor is further configured to optimize the task plan through iteration of the acquisition of state information, generation of a new task plan, and measurement of task time of the new task plan by simulated operation of the robot system.
6. The task planning device according to claim 5, further comprising transmitting the task plan to the robot system only after it is determined that the task plan has been optimized.

* * * * *